3,133,947
PREPARATION OF ESTERS OF THIOL-CARBAMIC ACIDS

Harry Tilles, El Cerrito, Calif., assignor to Stauffer Chemical Company, a corporation of Delaware
No Drawing. Filed Sept. 16, 1959, Ser. No. 840,242
6 Claims. (Cl. 260—455)

This invention relates in general to the preparation of certain thiolcarbamic acid esters.

It is an object of this invention to provide a process for the preparation of certain thiolcarbamates by a process which dispenses with any necessity for a solvent.

It is a further object of this invention to provide a process for the preparation of certain thiolcarbamates in high yield.

Other objects and advantages of this invention, if not specifically set forth, will become apparent during the course of the description which follows.

Generally, it has been found that thiolcarbamates of the general formula

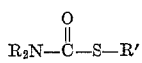

where the symbol R' represents lower alkyl, lower alkenyl or halo-substituted lower alkyl and where the R symbols represent hydrogen or individual organic radicals or together represent a single chain bonded at either end thereof to the nitrogen to form any of various heterocyclic rings, may be prepared by a process comprising: reacting a mole of a secondary or primary amine with a mole of carbonyl sulfide in the presence of an additional mole of basic material which may be any amine, including a tertiary amine, and thereafter reacting the so-formed intermediate with a mole of an organic sulfate, such as a dialkyl sulfate or a diallyl sulfate. The reactions are completed rapidly and liquids are obtained throughout the course of the process. The latter is of considerable importance, since the formation of solids would necessitate the use of a solvent and would complicate the process. The obtaining of a liquid system is unexpected for it has been noted that if other salts which often serve as functional equivalents of the sulfates are substituted, e.g., ethyl bromide or ethyl iodide, solid reaction products are obtained.

The esters of the thiolcarbamic acids so produced find particular use as herbicides. Such esters heretofore have been relatively difficult to produce, but the instant process provides a relatively straight-forward method for preparing them.

More particularly, the reaction may be represented by the following equations, where R' is as afore-stated and R represents hydrogen, phenyl, lower cycloalkyl, any furfuryl, alkyl, lower alkenyl, halo-substituted lower alkyl, halo-substituted lower alkenyl or lower alkoxy-substituted lower alkyl radical; in the alternative, the R symbols together may represent a single heterocyclic group which, with the nitrogen, forms a pyrrolidinyl, piperidyl or morpholinyl ring:

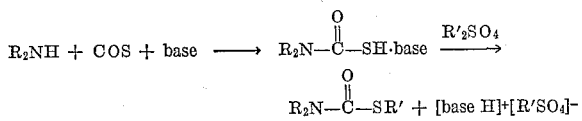

base=$R_2NH$ or $R_3N$, preferably $(CH_3)_3N$, $(C_2H_5)_3N$ or $(C_4H_9)_3N$.

The reaction medium consists entirely of non-corrosive materials and cheap, mild steel reactors are adequate.

The conditions of the reaction can be varied rather extensively without having much effect on the yield or quality of product. The carbonyl sulfide may be added to the amine at temperatures ranging from —30° to 60° C. and preferably from —20° to 50° C. It is a very exothermic and rapid reaction and requires cooling. The temperature can be controlled both by the amount of cooling and rate of addition of carbonyl sulfide. From a practical point of view, it is desirable to add the carbonyl sulfide at a temperature of 40–50° C., so that ordinary cooling water can be employed. The rate of addition of the carbonyl sulfide is not critical and from the practical viewpoint its rate should be governed by the capacity of the cooling system.

The reaction of the aliphatic sulfate with the thiolcarbamate salt is also exothermic. For the same reasons as given above, it is preferable to add the aliphatic sulfate (preferably a dialkyl sulfate) at a temperature of 40–50° C. and, in any event, within the range 30–60° C.

In order to ensure completeness of the reaction, the mixture may be heated to 100° C. over a period of 30–60 minutes.

The thiolcarbamate ester is liberated by the addition of water to the reaction mixture. It separates into two separate phases which can easily be separated. In order to ensure removal of any unreacted aliphatic sulfate, the reaction mixture is stirred with water at 50–100° C. from 15–30 minutes. This hydrolyzes any unreacted sulfate to water soluble products.

Instead of using two moles of dialkylamine per mole of carbonyl sulfide, one can use 1 mole of dialkylamine and 1 mole of trialkylamine, conveniently trimethyl- or triethylamine. This is advantageous in the case that the dialkylamine is expensive.

The amine used as the acid binding agent can be recovered by the addition of excess caustic to the aqueous solution which is formed during the liberation of the thiolcarbamate by addition of water to the reaction mixture.

Specific examples are set forth below showing the preparation of the esters of this invention, but these are for illustrative purposes only and are not to be interpreted as imposing limitations on the scope of the invention other than as set forth in the appended claims.

Example I 124 g. (2.06 moles) of carbonyl sulfide was bubbled with good agitation and with cooling into 404 g. (4.00 moles) of di-n-propylamine at a temperature range of —20 to 22° C. The reaction mixture remained liquid throughout the addition and gradually increased in viscosity. After completion of the carbonyl sulfide addition, 317 g. (2.06 moles) of diethyl sulfate was added dropwise with agitation, maintaining the temperature between 47–51° C. by means of external cooling. The reaction mixture gradually decreased in viscosity during the addition. The reaction mixture was then heated to 102° C. over 45 minutes, 100 cc. of water was added dropwise over 6 minutes, the temperature was maintained between 100–108° C. for 14 minutes and then 500 cc. more water was added. The phases were separated and the organic layer was washed with 1–250 cc. portion of 1.2 M hydrochloric acid and 2–100 cc. portions of water. The product was then stripped of water and volatile components by purging with argon (nitrogen would be satisfactory) for 26 minutes at a temperature range of 50–123° C. There was obtained as a residue 354 g. (93.6% yield) of ethyl di-n-propylthiolcarbamate, $n_D^{30}$ 1.4758. Gas chromatographic analysis shows a purity of 98.5%.

The aqueous layer which was obtained during the initial separation was treated with 250 cc. of 48% liquid caustic while cooling in an ice bath. Dipropylamine was liberated which formed an immiscible layer on the top. It was separated and weighed 234 g. This amine contained 8.2% water and 1.9% ethyl di-n-propylthiolcarbamate.

Example II 309 g. (5.15 moles) of carbonyl sulfide was bubbled with good agitation and with cooling into 1010 g. (10.00 moles) of di-n-propylamine at a temperature of 47–50° C. Then 794 g. (5.15 moles) of diethyl sulfate was added dropwise with stirring, maintaining the temperature between 46–54° C. with cooling. The reaction mixture was then heated to 67° C. over 1 hour, 2000 cc. of warm water was added and the mixture was stirred at 50° C. for 13 minutes. The phases were then separated and the organic layer was washed with 1–250 cc. portion of 2.4 M hydrochloric acid and 1–250 cc. portion of saturated salt solution. The product was then dried by bringing to reflux under water aspirator vacuum. There was obtained as a residue 846 g. (89.6% yield) of ethyl di-n-propylthiolcarbamate, $n_D^{30}$ 1.4757. Gas chromatographic analysis shows a purity of 99.0%.

Example III

A continuous reactor system was set up consisting of a small cylindrical glass reactor (6″ high x ⅞″ diameter) containing a gas dispersion tube and amine inlet tube on the bottom and an overflow tube on the top. The reactor was cooled by a small water jacket and stirred vigorously by a glass shaft containing four sets of bent vanes spaced ¾″ apart. This reactor, R–1, was connected via the outlet tube to a second reactor, R–2, which was a 250 cc. round bottom flask containing a stirrer, thermometer, inlet tube for R–1 reaction mixture, inlet tube for diethyl sulfate and an overflow tube to the R–3 reactor. The R–3 reactor was a 1 l. round bottom flask containing a stirrer, thermometer, inlet tube for R–2 reaction mixture and an overflow tube to the R–4 reactor. The R–4 reactor was a 5 l. 4 neck flask containing a stirrer, thermometer, inlet tube for R–3 reaction mixture and condenser.

Di-n-propylamine at a flow rate of 3 moles/hr. was introduced into the bottom of the R–1 reactor simultaneously with carbonyl sulfide flowing at a rate of 1.88 moles/hr. The temperature in R–1 was maintained at 50° C. by proper flow of cooling water. The retention time in R–1 was 5.01 minutes. When this reaction mixture overflowed into the R–2 reactor, diethyl sulfate addition began into the R–2 reactor at a flow rate of 1.57 moles/hr. The retention time in R–2 was 9.7 minutes and the temperature was maintained at 47–51° C. by cooling. This reaction mixture overflowed into the R–3 reactor which had a retention time of 65.5 minutes to ensure completion of the reaction. The temperature was maintained at 47–51° C. by heating. The R–4 reactor was used as a receiver and after completion of the run of 4 hours, 2400 cc. of water was added and the mixture was heated at 72–90° C. for 20 minutes. The phases were separated and the organic layer was not washed, but was dried by bringing to reflux under water pump vacuum. There was obtained as a residue 968 g. (90.2% yield) of ethyl di-n-propylthiolcarbamate, $n_D^{30}$ 1.4763. Gas chromatographic analysis shows a purity of 97.8%.

Example IV 20 g. (0.33 mole) of carbonyl sulfide was bubbled with good agitation and with cooling into a mixture of 29.1 g. (0.30 mole) of diallylamine and 30.3 g. (0.30 mole) of triethylamine at a temperature of 9–16° C. Then 47.6 g. (0.31 mole) of diethyl sulfate was added dropwise with stirring, maintaining the temperature at 17–25° C. with cooling. The mixture was then gradually heated to 109° C. over a period of 23 minutes, 150 cc. of warm water was added, and the mixture was stirred at 76–95° C. for 7 minutes. The phases were then separated and the organic phase was washed with 1–50 cc. portion of 2.4 M. hydrochloric acid and 1–50 cc. portion of saturated salt solution. The product was then dried by bringing to reflux under water pump vacuum, maximum temperature of refluxing product being 113° C. There was obtained as a residue 50.5 g. (91.0% yield) of ethyl diallylthiolcarbamate, $n_D^{30}$ 1.4996. Gas chromatographic analysis shows a purity of 99.0%.

Example V 20 g. (0.33 mole) of carbonyl sulfide was bubbled with good agitation and with cooling into 60.6 g. (0.60 mole) of N-ethyl-n-butylamine at a temperature of 47–54° C. Then 47.6 g. (0.31 mole) of diethyl sulfate was added dropwise with stirring, maintaining the temperature at 46–53° C. with cooling. The mixture was then heated to 107° C. over a period of 31 minutes, 150 cc. of water was then added and the mixture was stirred for 35 minutes at 58–100° C. The phases were separated and the organic phase was washed with 1–50 cc. portion of 2.4 M. hydrochloric acid and 2–50 cc. portions of water. It was dried by bringing to reflux under water aspirator vacuum. There was obtained 46.5 g. (82.0% yield) of ethyl N-ethyl-n-butylthiolcarbamate, $n_D^{30}$ 1.4794. Gas chromatographic analysis shows a purity of 98.8%.

Example VI 21 g. (0.35 mole) of carbonyl sulfide was bubbled with good agitation and with cooling into a mixture of 30.3 g. (0.30 mole) of N-ethyl-n-butylamine and 30.3 g. (0.30 mole) of triethylamine at a temperature of 26–52° C. Then 47.6 g. (0.31 mole) of diethyl sulfate was added dropwise with stirring, maintaining the temperature at 32–52° C. with cooling. The mixture was then heated to 150° C. unintentionally over 41 minutes, cooled to 100° C., 150 cc. of water was added and it was stirred for 31 minutes at 58–100° C. The phases were then separated and the organic phase was washed with 1–50 cc. portion of 2.4 M hydrochloric acid and 2–50 cc. portions of water. The product was dried by heating to reflux under water aspirator vacuum, maximum temperature of refluxing product being 130° C. There was obtained 45.2 g. (79.7% yield) of ethyl N-ethyl-n-butylthiolcarbamate, $n_D^{30}$ 1.4803. Gas chromatographic analysis shows a purity of 94.6%.

Example VII 21 g. (0.35 mole) of carbonyl sulfide was bubbled with good agitation and with cooling into 60.6 g. of di-n-propylamine at a temperature of 47–51.5° C. Then 56.3 g. (0.31 mole) of di-n-propyl sulfate was added dropwise with stirring, maintaining the temperature at 38.5–45.0° C. with cooling. The mixture was then heated to 100° C. over 50 minutes, 150 cc. of warm water was added and it was stirred at 61–102° C. for 43 minutes. The phases were then separated, the organic phase was not washed, but was dried by bringing to reflux under water pump vacuum. There was obtained 56 g. (92.2% yield) of n - propyl di-n-propylthiolcarbamate, $n_D^{30}$ 1.4791. Gas chromatographic analysis shows a purity of 99.9%.

Example VIII 21 g. (0.35 mole) of carbonyl sulfide was bubbled with good agitation and with cooling into 60.6 g. (0.60 mole) of N-ethyl-n-butylamine at a temperature of 43.5–53.5° C. Then 56.3 g. (0.31 mole) of di-n-propyl sulfate was added dropwise with stirring, maintaining the temperature at 39.5–44.0° C. with cooling. The mixture was then heated to 110° C. over 44 minutes, 150 cc. of warm water was added and it was stirred at 65–100° C. for 42 minutes. The phases were then separated, the organic phase was washed with 1–50 cc. portion of 1.2 M hydrochloric acid and 2–50 cc. portions of water. The product was dried by heating to reflux under water aspirator vacuum, maximum temperature of refluxing product being 142° C. There was obtained 56.1 g. (92.2% yield) of n-propyl N-ethyl-n-butylthiolcarbamate, $n_D^{30}$ 1.4842. Gas chromatographic analysis shows a purity of 99.9+%.

The process is limited by the availability of the sulfates and of the primary and secondary amines. Suitable sulfates are diethyl sulfate, diallyl sulfate, bis(2-chloroethyl) sulfate, bis(2-chloropropyl) sulfate, bis(2-fluoroethyl) sulfate, and bis(2-bromoethyl) sulfate. Any other sulfates which may be available and which satisfy the general formula $R'_2SO_4$ where $R'$ is an organic radical may be used in the process.

In addition to the amines set forth in the examples above, the following are typical of the amines which may be employed satisfactorily:

methylamine
ethylamine
di-i-butylamine
di-n-amylamine
N-methylbutylamine
N-methyl-n-hexylamine
di-2-chloropropylamine
N-allylethylamine
N-allylpropylamine
di-3-chloroallylamine
N-3-chloroallylallylamine
N-i-butyl-3-chloroallylamine
N-methallyl-n-propylamine
di-2-bromoallylamine
N-ethylcyclohexylamine
dicyclohexylamine
N-ethylcyclohexylamine
3-methoxypropylamine
3-methoxyethylamine
N-methylaniline
N-ethylaniline
furfurylamine
pyrrolidine
piperidine
2-methylpiperidine
morpholine Obviously, many modifications and variations of this invention may be made without departing from the spirit and scope thereof, and therefore only such limitations should be imposed as are indicated in the appended claims.

I claim:
1. The process for the preparation of esters of thiolcarbamic acid comprising:
    (a) reacting at an initial temperature of not in excess of 54° C. one mole of carbonyl sulfide with one mole of a first amine selected from the class consisting of pyrrolidine, piperidine, morpholine and primary and secondary amines of the general formula $R_2NH$ where R is selected from the class consisting of hydrogen, phenyl, cyclohexyl, furfuryl, alkyl, lower alkenyl, halo-substituted lower alkyl, halo-substituted lower alkenyl, lower alkoxy and mixtures thereof, no more than a single of the R groups representing hydrogen, in the presence of at least an additional mole of an amine selected from the class consisting of pyrrolidine, piperidine, morpholine and amines of the general formula $R''_3N$ where $R''$ is selected from the class consisting of hydrogen, phenyl, cyclohexyl, furfuryl, alkyl, lower alkenyl, halo-substituted lower alkyl, halo-substituted lower alkenyl, lower alkoxy and mixtures thereof, no more than two of the $R''$ groups representing hydrogen, to form an intermediate;
    (b) and thereafter reacting said intermediate so formed with an organic sulfate of the formula $R'_2SO_4$ where $R'$ is selected from the class consisting of lower alkyl, lower alkenyl, halo-substituted lower alkyl and mixtures thereof to form esters of thiolcarbamic acid of the formulae

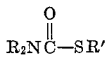

where the first amine used is that of the formula $R_2NH$ as aforestated and of the formula

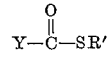

the symbol Y being selected from the class consisting of pyrrolidinyl, piperidyl and morpholinyl where the first amine is selected from the class consisting of pyrrolidine, piperidine and morpholine as aforestated, said process being carried out in the absence of an added solvent.

2. The process of claim 1 wherein the reaction involving said carbonyl sulfide is carried out within a temperature range of about —30° C. to 54° C. and wherein the reaction between the intermediate so formed and the said organic sulfate is carried out at a temperature within the range of about 30° C. to 60° C.

3. A process for the preparation of ethyl di-n-propylthiolcarbamate comprising: reacting at an initial temperature of not in excess of 54° C. about two moles di-n-propylamine with about one mole of carbonyl sulfide whereby to form an intermediate and thereafter reacting said intermediate so formed with diethyl sulfate, said process being carried out in the absence of an added solvent.

4. A process for the preparation of ethyl diallylthiolcarbamate comprising: reacting at an initial temperature of not in excess of 54° C. about one mole diallylamine with about one mole of carbonyl sulfide in the presence of about one mole tertiary amine whereby to form an intermediate and thereafter reacting said intermediate so formed with diethyl sulfate, said process being carried out in the absence of an added solvent.

5. A process for the preparation of ethyl N-ethyl-n-butylthiolcarbamate comprising: reacting at an initial temperature of not in excess of 54° C. about two moles N-ethyl-n-butylamine with about one mole of carbonyl sulfide whereby to form an intermediate and thereafter reacting said intermediate so formed with diethyl sulfate, said process being carried out in the absence of an added solvent.

6. A process for the preparation of ethyl N-ethyl-n-butylthiolcarbamate comprising: reacting at an initial temperature of not in excess of 54° C. about one mole N-ethyl-n-butylamine with about one mole of carbonyl sulfide in the presence of about one mole tertiary amine whereby to form an intermediate and thereafter reacting said intermediate so formed with diethyl sulfate, said process being carried out in the absence of an added solvent.

References Cited in the file of this patent

Tilles: J.A.C.S. 81 (1959) page 726.
Bergmann: "The Chemistry of Acetylene and Related Compounds," (1948) page 80.